Patented July 26, 1949

2,477,373

UNITED STATES PATENT OFFICE 2,477,373

CATALYST PREPARATION

James B. Hunter, Upper Darby, Pa., assignor to The Atlantic Refining Company, Philadelphia, Pa., a corporation of Pennsylvania No Drawing. Application April 17, 1946, Serial No. 662,934

4 Claims. (Cl. 252—455)

The present invention relates to the preparation of silica-alumina catalysts of improved stability, and relates more particularly to the production of silica-alumina catalysts containing acid adsorptive alumina, which catalysts are suitable for use in the conversion or refining of hydrocarbons, especially petroleum and fractions thereof.

In the production of gasoline and other fuels, it has been conventional practice to crack higher boiling hydrocarbon oils in the presence of various catalysts, including silica-alumina compositions in the form of finely divided particles or in the form of granules or pellets. These catalysts, after use, become fouled with carbonaceous materials, and are usually regenerated first by stripping out entrained oil by contacting with steam, and then burning off the carbonaceous deposits by contacting with air or air and steam at elevated temperatures. However, it has been found that the cracking activity of the catalysts deteriorates upon repeated use and regeneration, and that the commercial silica-alumina catalysts available are very sensitive to steaming and have a relatively poor steam stability. These catalysts are prepared by various methods, of which the following are most common. In one method, precipitated hydrated silica gel is suspended in a solution of an aluminum salt, and the alumina is precipitated in the silica gel by the addition of an alkali hydroxide or ammonia. In a second method, purified silica and alumina hydrogels which have been separately prepared are intimately mixed, dried, and activated by heating. In a third method, silica hydrogel is saturated with a solution of an aluminum salt, and the mixture is heated to decompose the salt and deposit alumina on the silica. The catalysts prepared by these and other prior art methods rapidly lose their conversion efficiency, due in part to the present methods of regeneration. Since steaming has been found to be the most effective way of removing entrained oil from the spent catalyst prior to thermal regeneration in the presence of air, it is apparent that any improvement in the heat stability, and particularly the steam stability, of the catalyst will constitute a marked advantage.

It has been observed that the alumina constituent of the prior art silica-alumina catalysts has a very low capacity for the adsorption of hydrogen ions, e. g., mineral acids, such as dilute hydrochloric acid, and may generally be characterized as non-acid adsorptive alumina. It has also been observed that the steam stability of the prior art silica-alumina catalysts is relatively low. On the other hand, it has been found that a certain type of alumina prepared under certain conditions has a high acid adsorptivity and a good steam stability. It is therefore an object of this invention to prepare an improved silica-alumina catalyst, the alumina constituent of which is characterized by its high acid adsorptivity and steam stability, thereby imparting to the catalyst as a whole, such desirable property. In addition to improved stability, the catalysts produced in accordance with this invention are further characterized by their unusual hardness and resistance to breakdown during use.

In accordance with this invention, there is provided a novel method for combining silica with alumina, wherein silica gel is caused to form through the agency of, and in intimate contact with, the alumina. The alumina here employed is one of high acid adsorptivity, the preparation of which will be described hereinafter in detail.

In carrying out this invention, an alkali metal silicate solution such as an aqueous solution of sodium silicate is treated with an excess of mineral acid, such as dilute hydrochloric or sulfuric acid, whereby there is obtained a clear solution having a pH not in excess of 3, and preferably between 1 and 2. At this relatively low pH, no precipitation or gelation of silica occurs, and the product comprises a silica sol which is distinctly on the acid side. To this silica sol is then added an acid adsorptive alumina in an amount sufficient to provide the desired alumina content in the final silica-alumina catalyst. The mixture is thoroughly agitated to uniformly disperse the alumina in the silica sol. Acid adsorption immediately commence on the surface of the alumina, whereby the pH of the mixture gradually increases to a value above 3, and preferably above 4, at which point the mixture sets to a firm gel. The gel may be aged in the presence of the reaction liquor for periods up to about 15 days, if desired, and then thoroughly washed to effect removal of acid and soluble salts, or the gel may be washed immediately without ageing. The washing may be accomplished with water, or with an ammonium salt solution, or with a dilute mineral acid solution followed by water. The washed sol is then dried to remove free water, granulated by suitable means, and activated by heating at temperatures between 700° F. and 1200° F., and preferably between 900° F. and 1000° F. In preparing the silica-alumina catalyst, the ratio of silica to alumina may be varied as desired. In general, a ratio of silica to alumina within the range of 19:1 to 1:3 has been found satisfactory, those catalysts in which the alumina predominates usually being the most stable.

In producing the alumina having a high acid adsorptivity and a high heat stability, an aqueous solution of aluminum sulfate is reacted with an aqueous solution of an alkali metal bicarbonate, or a mixture of carbonate and bicarbonate, of which the latter constitutes at least 50%. While it is possible to use chemically equivalent amounts of aluminum sulfate and bicarbonate or carbonate-bicarbonate mixture, or to use an excess of aluminum sulfate over bicarbonate or carbonate-bicarbonate, it has been been found that the best results are obtained using an excess of bicarbonate or carbonate-bicarbonate over aluminum sulfate. It is preferred to employ a total equivalent ratio of bicarbonate or carbonate-bicarbonate of about 1.3, or in other words about 30% excess alkali over that theoretically required for complete reaction with the aluminum sulfate. This ratio may vary somewhat, but should be maintained within the range of 1.1 to 1.5 to obtain aluminas of highest acid adsorptivity and heat stability. Best results have been obtained using alkali bicarbonate, per se, although suitable aluminas may be prepared using carbonate-bicarbonate mixtures in which the bicarbonate represents at least 50% of the mixture. When the amount of bicarbonate is less than about 50%, the stability of the alumina decreases markedly, the lowest stability being attained using carbonate, per se. The use of soluble aluminum salts such as the chloride and nitrate, with alkali metal bicarbonate or carbonate-bicarbonate mixtures gives aluminas of mediocre acid adsorptivity and very poor heat stability, as well as of gelatinous structure and poor filterability. Similarly, the production of aluminas by the treatment of any soluble aluminum salt, including the sulfate, with strong alkalis such as sodium, potassium, or ammonium hydroxides yields poor quality products having negligible acid adsorptivities and poor stability.

In carrying out the preparation of the improved aluminas, it is preferred to use reactant solutions of relatively high concentration, since high concentration appears to beneficially affect the resulting alumina. To this end, it is desirable to use solutions having a normality of at least 1, and preferably between 2 and 4. The reaction between the aluminum sulfate and the alkali metal bicarbonate or carbonate-bicarbonate may be carried out at ordinary temperatures (60° F. to 80° F.), or at somewhat higher or lower temperatures without adverse effect. In the preferred method of operation, the aluminum sulfate solution is made up, and to this is added the bicarbonate solution in the required amount. When both bicarbonate and carbonate are used, the necessary amount of bicarbonate solution is added first, and the carbonate solution is thereafter added. However, the order of addition may be reversed, or a mixture of bicarbonate and carbonate may be made up in a single solution, and such solution added to the aluminum sulfate solution. During the addition of the alkali to the sulfate solution, vigorous agitation is maintained, and upon completion of the addition, the reactant solution containing the alumina may be immediately filtered to remove the alumina, or the alumina may be aged in the reaction liquor for a suitable period prior to the filtration or other treatment. It has been found, in general, that ageing of the alumina in the reaction liquor for periods up to about 15 days, gives products of substantially higher acid adsorptivity and heat stability than aluminas which are immediately removed from the reaction liquor and washed. However, regardless of whether or not the alumina is aged, such alumina may ultimately be washed with water or aqueous solutions containing ammonium salts in order to remove residual alkali metal compounds.

In order to illustrate the preparation of aluminas of high acid adsorptivity and stability suitable for use in accordance with the present invention, as compared with other aluminas not suitable, the following examples are given.

Various amounts of 1 N $NaHCO_3$, 1 N $Na_2CO_3$, and 1 N NaOH alone and in various ratios to each other were added dropwise, at 80° F. and with vigorous agitation, to 650 cc. portions of 2 N aluminum salt solutions. This quantity of aluminum salt yielded approximately 22 grams of alumina (dry basis). After precipitation, the alumina slurry was divided into two equal parts. One part was washed immediately with 3 separate portions of 500 cc. each of distilled water, with 5 minutes stirring per wash. After each wash the alumina was filtered on a Buchner funnel under vacuum (15 inches mercury). Following the last wash and filtration, the cake was repulped with 250 cc. of distilled water, stirred for 5 minutes, and stored in a pint bottle. The second portion of the original slurry (containing the reaction liquor) was stored in a one quart bottle for a period of one week. The slurry was then filtered and washed according to the procedure given above. The washed alumina was then repulped in 250 cc. of distilled water, and stored in a pint bottle. The concentration of alumina in the test samples was therefore 11 grams per 250 cc. of water. The samples thus prepared were then subjected to tests for acid adsorptivity and heat stability.

The slurry sample was vigorously agitated in the bottle and then poured into a 2 inch Buchner funnel under vacuum (15 inches of mercury). The water was thus removed from the alumina which formed a small, compact cake which eventually cracked. After the cake has cracked, the vacuum was released, and two samples of the alumina were taken from the cake by means of a small, open-ended glass cylinder having a length of 3 cm., inside diameter 1.5 cm., and outside diameter 1.75 cm. The quantity of alumina exactly filling this volume was designated as 1 gel unit. One gel unit was placed in each of two 400 cc. beakers and 100 cc. of distilled water was added to produce a thin slurry. The pH of the slurry was determined electrometrically, during agitation, and acid adsorptivity was measured by adding approximately 0.1 N hydrochloric acid (0.0953 N HCl) in 10 cc. increments, allowing a suitable period of time to attain an equilibrium pH, which time never exceeded 5 minutes. Increments of hydrochloric acid were added until the pH of the slurry fell to a value below 3. The date may then be plotted as pH against cc. of 0.1 N HCl, and the number of cc. of 0.1 N HCl required to lower the pH of the slurry from 4.5 to 3.5 was defined as the adsorption.

The second sample, after making up into a thin slurry with 100 cc. of distilled water, was placed on an electric hot plate and the temperature of the slurry was rapidly brought to the boiling point with continuous stirring. As soon as a temperature of 212° F. was reached, the beaker containing the slurry was removed and quickly transferred to a tray of water (60° F.–80° F.), where the slurry was continuously stirred until the temperature had dropped below 150° F. After reaching room temperature (70° F.), the sample was titrated with hydrochloric acid as described above. The stability was defined as the number of cc. of 0.1 N HCl required to lower the pH of the heat treated slurry from a value of 4.5 to 3.5.

The results obtained in the various systems are given in the following table:

System AlCl₃—NaHCO₃—NaOH

| Equiv. Ratio NaHCO₃/AlCl₃ | Final Equiv. Ratio NaHCO₃+NaOH/AlCl₃ | Alumina, Washed | | Alumina, Aged-Washed | |
|---|---|---|---|---|---|
| | | Adsorption | Stability | Adsorption | Stability |
| 1.500 | 1.500 | 108 | 4 | 184 | 72 |
| 0.838 | 1.000 | 62 | 3 | 65 | 3 |
| 0.500 | 1.000 | 46 | 3 | 39 | 3 |

System AlCl₃—NaHCO₃—Na₂CO₃

| NaHCO₃/AlCl₃ | NaHCO₃+Na₂CO₃/AlCl₃ | | | | |
|---|---|---|---|---|---|
| 1.300 | 1.300 | 116 | 25 | 130 | 17 |
| 0.838 | 1.300 | 98 | 3 | 119 | 11 |
| 0.500 | 1.300 | 78 | 3 | 90 | 8 |
| 0.000 | 1.300 | 102 | 3 | 84 | 14 |

System Al₂(SO₄)₃—NaHCO₃—Na₂CO₃

| NaHCO₃/Al₂(SO₄)₃ | NaHCO₃+Na₂CO₃/Al₂(SO₄)₃ | | | | |
|---|---|---|---|---|---|
| 1.300 | 1.300 | 302 | 273 | 317 | 296 |
| 0.838 | 1.300 | 322 | 236 | 340 | 254 |
| 0.500 | 1.300 | 205 | 66 | 316 | 141 |
| 0.000 | 1.300 | 324 | 107 | 299 | 110 |

From the above data, it will be seen that in order to produce aluminas having a high acid adsorptivity and stability, it is necessary to employ aluminum sulfate and an alkali metal bicarbonate, or a carbonate-bicarbonate combination in which the bicarbonate predominates. In each of the above examples, the entire quantity of bicarbonate was added first, and the remaining alkali required, i. e., carbonate or hydroxide was then added. It will be observed that in most cases, ageing of the alumina in the reaction liquor for 7 days, prior to washing, resulted in a marked increase in adsorptivity and stability. In preparing the silica-alumina catalysts of the present invention, it is preferred to use aluminas having an acid adsorptivity of at least 300 and a stability of at least 200, in order to obtain the desired properties in the ultimate catalyst composition.

The production of the silica-alumina catalyst according to the present invention is illustrated by the following example, which, however, is not to be construed as limiting the scope thereof. The quantities of reactants were calculated to give a catalyst comprising 85% silica and 15% alumina.

443 cc. of commercial sodium silicate solution (an aqueous solution containing 36% Na₂O.3.43SiO₂) was diluted with 1290 cc. of water, and to this solution was added 141 cc. of concentrated hydrochloric acid (36.7% HCl) diluted with 710 cc. of water. The resulting acid-stabilized silica sol was a clear solution having a pH of 2.

An acid adsorptive alumina was prepared by reacting an aqueous aluminum sulfate solution (2N) with an aqueous solution of sodium bicarbonate (1N), the ratio of sulfate to bicarbonate being 1 to 1.3. The resulting alumina was separated from the reactant solution, and was thoroughly washed with water to remove sodium sulfate and excess bicarbonate. The alumina, when tested as set forth hereinbefore, had an acid adsorptivity of 302 and a stability of 273. This alumina was made up into a slurry with water (37 grams of Al₂O₃ on a dry basis, made up to 813 grams of slurry), and the slurry was added, with vigorous agitation, to the acid-stabilized silica sol as above prepared. When the alumina was uniformly dispersed in the sol, acid adsorption immediately set in, and within about 1 minute the pH of the mixture rose to 4.8. After permitting the mixture to stand, a white, glassy, opaque, fairly stiff mixed gel set in about 8 minutes. The silica-alumina gel was then broken up and allowed to stand quiescent for 18 hours, after which it was washed 8 times with 2.5 liters of water containing 2.5 cc. of concentrated hydrochloric acid. The gel was then washed 4 times with 2.5 liters of water to remove the hydrochloric acid, and then dried at 220° F. to remove free water. The resulting dried gel was exceedingly hard, and upon wetting with a small amount of water, broke down into small granules of the order of 20 to 30 mesh size, which granules were hard and glasslike. The granules were redried at 220° F., ground and screened to 40–325 mesh, and activated by heating for 1 hour at 932° F. in the presence of air. For use in the so-called "fluid" catalytic cracking operations, only fine mesh catalyst is suitable, whereas in the "fixed bed" cracking processes, the catalyst is usually formed into pellets approximately 4 mesh.

It has been observed that in those processes in which the used catalyst is contacted with steam to remove entrained oil prior to regeneration with air at elevated temperatures of the order of 900° F. to 1100° F., the rate of diminution of catalytic activity is most rapid during the early period of use, and generally levels out over an extended period of use. This rapid diminution at the outset appears to be due for the most part to the effect of the stripping steam, the effects of the thermal regeneration with air being of minor importance. Therefore, in order to determine the stability of the catalyst, an accelerated test has been devised which simulates the conditions encountered during the early period of catalyst use where the decline of catalytic activity is most pronounced. In this test the catalyst is contacted with steam at 1050° F. for 30 hours, and the cracking activity is then determined, and compared with the cracking activity of fresh, unsteamed catalyst. The results thus obtained are indicative of the stability of the catalyst. In carrying out the cracking activity test, 25 cc. of the powdered catalyst is placed in a tube and maintained at a temperature of 932° F. and 400 cc. of oil is vaporized and passed through the catalyst in a period of 2 hours. The cracked products are separated, and the quantity of distillate boiling up to 400° F., as well as gas and loss is determined, and is designated as the distillate plus loss (D+L).

It has been found that the catalysts produced in accordance with the present invention and including acid adsorptive alumina show, in general, a decrease in activity by the steam test of only about 10%, whereas the prior art catalysts containing non-acid adsorptive alumina exhibit a decrease in activity of the order of 25%.

The catalysts of the present invention are useful not only in cracking high boiling hydrocarbon oil to produce gasoline, but also in reforming straight-run or cracked gasoline, in polymerizing hydrocarbon gases, in isomerizing hydrocarbon oils and gases, in desulfurizing and refining oils, and the like.

I claim:

1. The method of preparing a silica-alumina catalyst, which comprises mixing with an acid-stabilized silica sol having a pH between 1 and 3, an acid adsorptive alumina having an acid adsorptive value of at least 300 and a stability of at least 200 in an amount sufficient to raise the pH of the mixture about 3 by adsorption of acid from the acid-stabilized sol, said acid adsorptive alumina having been prepared by reacting aluminum sulfate with an alkali metal bicarbonate, permitting the silica-alumina gel formation to occur by the increased pH of the silica sol, and washing acid and soluble salts from the gel.

2. The method of preparing a silica-alumina catalyst, which comprises mixing with an acid-stabilized silica sol having a pH between 1 and 3, an acid adsorptive alumina having an acid adsorptive value of at least 300 and a stability of at least 200 in an amount sufficient to raise the pH of the mixture above 3 by adsorption of acid from the acid-stabilized sol, said acid adsorptive alumina having been prepared by reacting aluminum sulfate with an alkali metal bicarbonate, permitting the silica-alumina gel formation to occur by the increased pH of the silica sol, washing acid and soluble salts from the gelt, drying the gel, and activating the dried gel by heating at elevated temperature.

3. The method of preparing a silica-alumina catalyst, which comprises mixing with an acid-stabilized silica sol having a pH between 1 and 3, an acid adsorptive alumina having an acid adsorptive value of at least 300 and a stability of at least 200 in an amount sufficient to raise the pH of the mixture above 3 by adsorption of acid from the acid-stabilized sol, said acid adsorptive alumina having been prepared by reacting aluminum sulfate with an alkali metal carbonate and bicarbonate of which the bicarbonate constitutes at least 50%, permitting the silica-alumina gel formation to occur by the increased pH of the silica sol, and washing acid and soluble salts from the gel.

4. The method of preparing a silica-alumina catalyst, which comprises mixing with an acid-stabilized silica sol having a pH between 1 and 3, an acid adsorptive alumina having an acid adsorptive value of at least 300 and a stability of at least 200 in an amount sufficient to raise the pH of the mixture above 3 by adsorption of acid from the acid-stabilized sol, said acid adsorptive alumina having been prepared by reacting aluminum sulfate with an alkali metal carbonate and bicarbonate of which the bicarbonate constitutes at least 50%, permitting the silica-alumina gel formation to occur by the increased pH of the silica sol, washing acid and soluble salts from the gel, drying the gel, and activating the dried gel by heating at elevated temperature.

JAMES B. HUNTER.

REFERENCES CITED

The following references are of record in the file of this patent:

UNITED STATES PATENTS

| Number | Name | Date |
| --- | --- | --- |
| 1,942,799 | Brewer et al. | Jan. 9, 1934 |
| 2,307,878 | Connolly | Jan. 12, 1943 |
| 2,356,303 | Connolly | Aug. 22, 1944 |
| 2,384,945 | Marisic | Sept. 18, 1945 |
| 2,390,272 | Riesmeyer et al. | Dec. 4, 1945 |

FOREIGN PATENTS

| Number | Country | Date |
| --- | --- | --- |
| 392,954 | Great Britain | May 22, 1933 |